Sept. 8, 1959 F. E. ABERER ET AL 2,902,757
POWER-OPERATED CAN OPENER
Filed Jan. 2, 1958 3 Sheets-Sheet 1

INVENTORS.
Henry J. Talge
Frank E. Aberer
BY
Thos E Scofield
ATTORNEY.

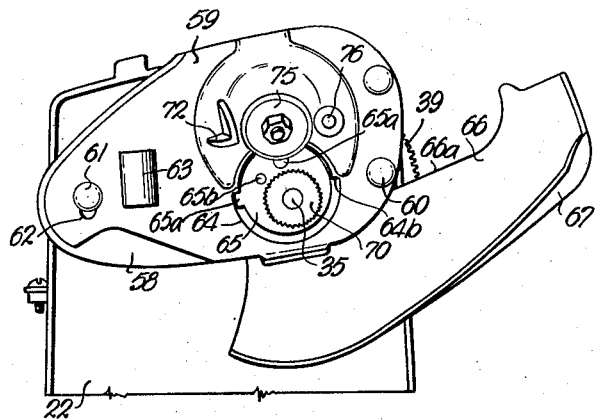
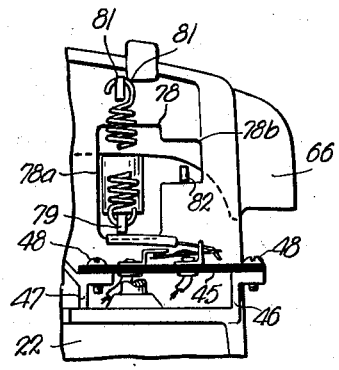
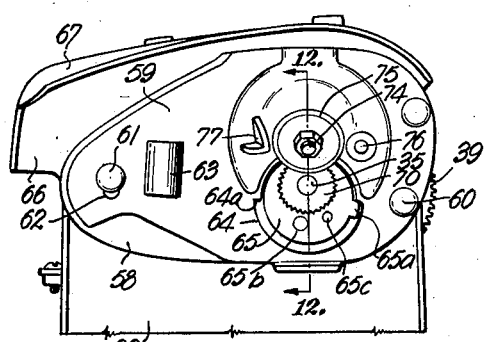
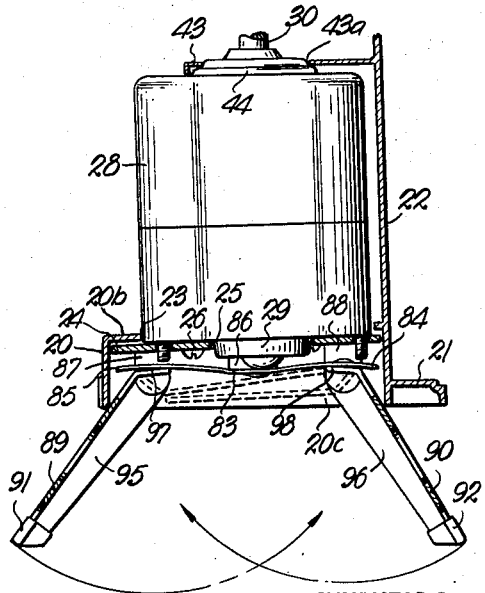

Sept. 8, 1959     F. E. ABERER ET AL     2,902,757
POWER-OPERATED CAN OPENER
Filed Jan. 2, 1958     3 Sheets-Sheet 3
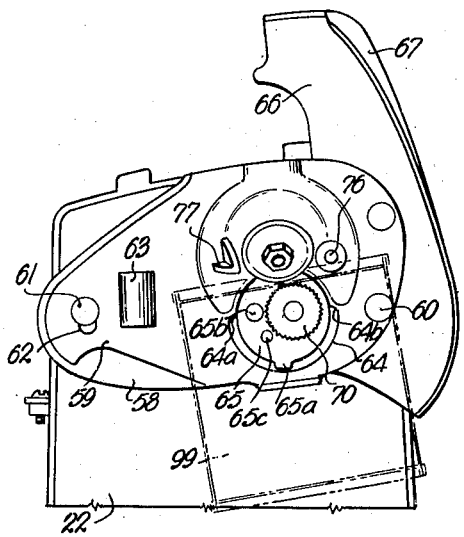
Fig. 9.
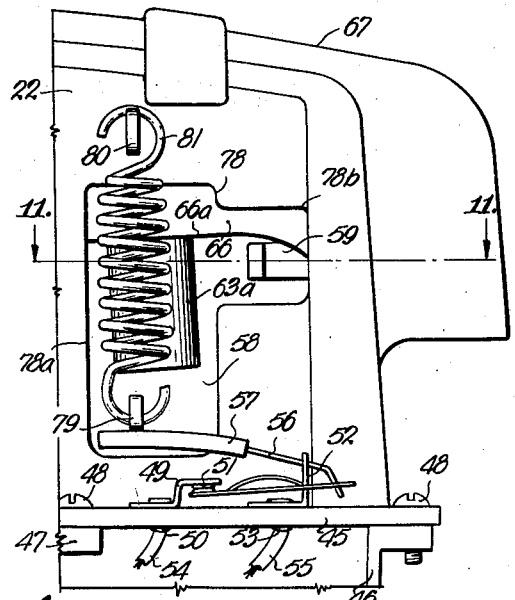
Fig. 10.
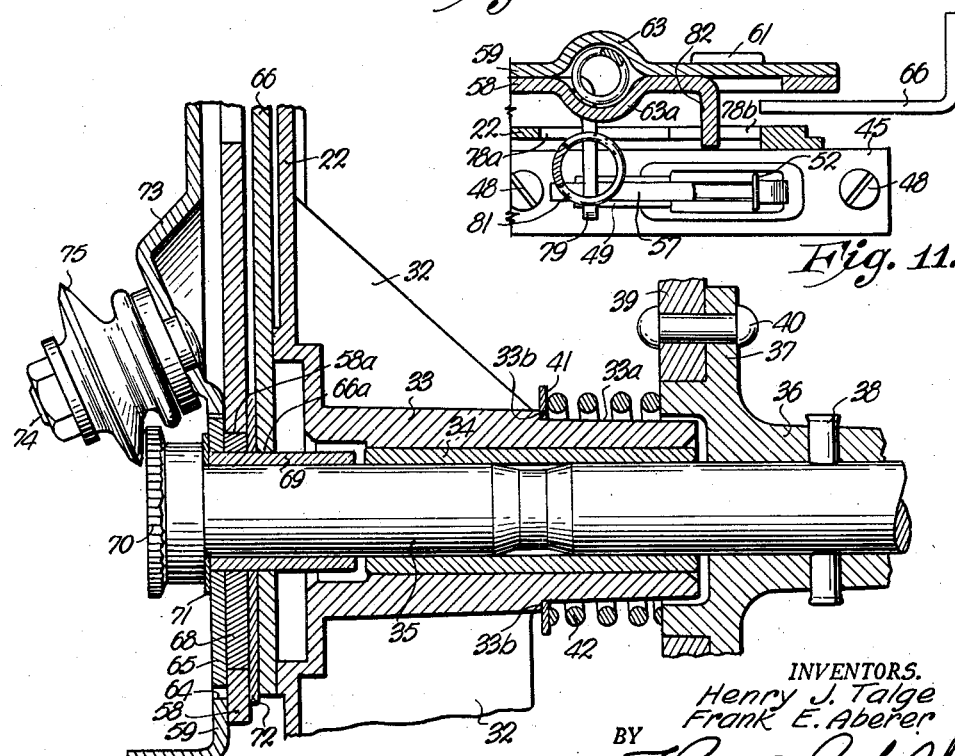
Fig. 11.
Fig. 12.
INVENTORS.
Henry J. Talge
Frank E. Aberer
BY
Thos E Scofield
ATTORNEY.

United States Patent Office 2,902,757
Patented Sept. 8, 1959

2,902,757

POWER-OPERATED CAN OPENER

Frank E. Aberer, Kansas City, Kans., and Henry J. Talge, Kansas City, Mo.; said Aberer assignor to said Talge Application January 2, 1958, Serial No. 706,608

6 Claims. (Cl. 30—4)

This invention relates to power-operated can openers and refers more particularly to a power-operated can opener wherein the power source is actuated before completion of the puncturing of the can top and maintained in operation, both during the puncturing and cutting of the can only by constant application of force by the operator to the opener actuating lever.

This application is a continuation-in-part of and an improvement over our application Serial No. 662,464, filed May 29, 1957, entitled "Power-Operated Can Opener."

An object of the invention is to provide a power-operated can opener wherein the power source is actuated only by actual physical application of force to the opener actuating lever by the operator and only maintained in operation while such force is continuously applied to the opener actuating lever, automatic means being provided for shutting off the power when the application of force is ceased.

Another object of the invention is to provide a power-operated can opener wherein the operation of the power unit is controlled at all times by the operator and it will automatically be shut off in case of difficulty or hazard to the operator simply, easily and in an extremely short time whenever the operator fails to maintain predetermined force on the actuating lever, against spring means always adequate to operate the switch to break the power circuit at any time such force is not applied and maintained by the operator.

Another object of the invention is to provide a power-operated can opener which is simple in construction, rugged, has a long life under hard service, a minimum number of parts and which is relatively economical to manufacture.

Another object of the invention is to provide a power-operated can opener wherein all of the parts are readily accessible for repair or replacement.

Another object of the invention is to provide a power-operated can opener wherein force must be applied to the can opener actuating lever by the operator to actuate the power source therein, wherein the power source aids in the puncturing of the end of the can by being actuated by the can piercing lever before the can end is actually pierced, thereby materially reducing the force that otherwise would have to be applied by the operator to manually pierce the end of the can.

Another object of the invention is to provide a power-operated can opener having means thereon to vary the height of the can opener relative the work surface upon which it is mounted whereby to accommodate cans of varying height.

Still another object of the invention is to provide such a power-operated can opener with means for varying the height of the opener above the work surface upon which the opener is to be mounted, the said height varying means being retractable when not in operation for convenience and, as well, providing an extremely stable base in the operation of the opener.

Another object of the invention is to provide a power-operated can opener wherein means are provided affording constantly operating forces which tend to shut off the can opener against the force applied by the operator, said forces greater than any counteracting forces generated by the opener itself in operation which might tend to maintain the power source in operation should the operator relax his application of force to the opener.

Other and further objects of the invention will appear in the course of the following description thereof.

In the drawings, which form a part of the instant invention and are to be read in conjunction therewith, embodiments of the invention are shown and, in the various views, like numerals are employed to indicate like parts.

Fig. 4 is a front view of the can engaging portion of the inventive can opener showing the can cutter and feed wheels separated to permit engagement of a can therebetween.

Fig. 5 is a view similar to the view of Fig. 4 but with the can cutter and feed wheels positioned as close to one another (overlapping as in Fig. 12) as possible with the power source not actuated.

Fig. 6 is a view similar to that of Fig. 5 but with the can opener mechanism in a position wherein the power source is actuated and running.

Fig. 7 is a partial rear view of the power source actuating mechanism in operating position with parts shown in dotted lines and cut away to better illustrate the invention.

Fig. 8 is a view taken along the lines 8—8 of Fig. 1 in the direction of the arrows.

Fig. 9 is a front view of the can engaging portion of the inventive can opener showing the can cutter and feed wheel engaging a can rim therebetween just before puncturing thereof.

Fig. 10 is an enlarged, partial rear view of the power source actuating mechanism on the down stroke thereof immediately after the switching has been actuated to turn on the power source.

Fig. 11 is a view taken along the lines 11—11 of Fig. 10 in the direction of the arrows.

Fig. 12 is a cross-sectional view of a portion of the inventive power-operated can opener taken along the lines 12—12 of Fig. 5 in the direction of the arrows.

Figure 3:
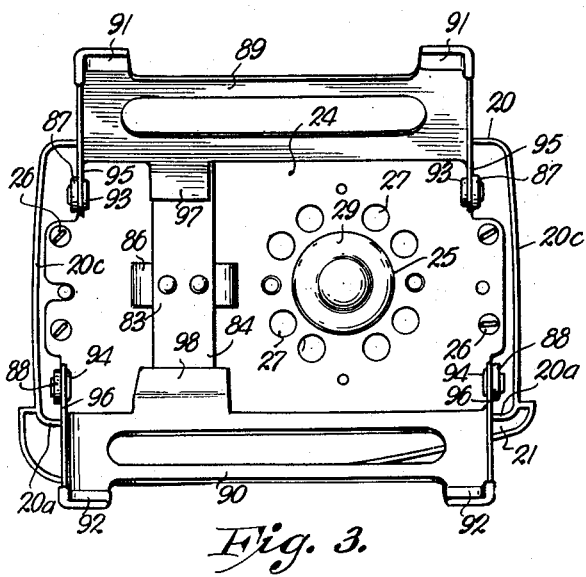
Fig. 3 is a view of the underside of the inventive can opener showing the retractable legs in extended position.

Referring to the drawings, at 20 is indicated the rear face of a hollow base. Horizontal front extension or flange 21 is affixed to the front face 20a of the base and vertical front plate 22 extends upwardly from the former. Plate 22 is of rigid, strong construction material such as cast metal. Referring to Fig. 8, base top 20b has opening 23 therein and sides 20c thereon. Motor mounting plate 24 (Figs. 3 and 8) has opening 25 therein and is fixed to the underside of base top 20b by screws 26. A plurality of ventilation openings 27 are also formed in plate 24.

Figure 1:
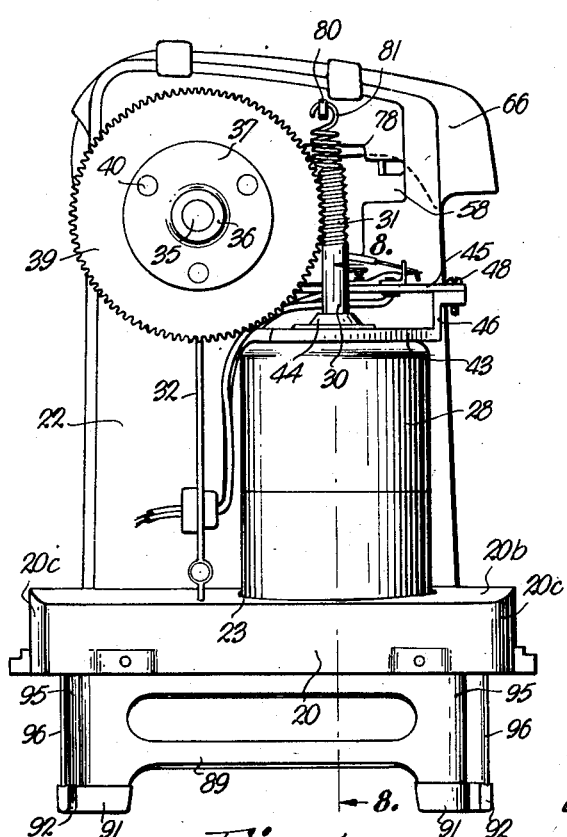
Fig. 1 is a rear view of the inventive power-operated can opener with a part shown in dotted lines to clarify the construction and, additionally, the retractable legs shown in extended position.
Figure 2:
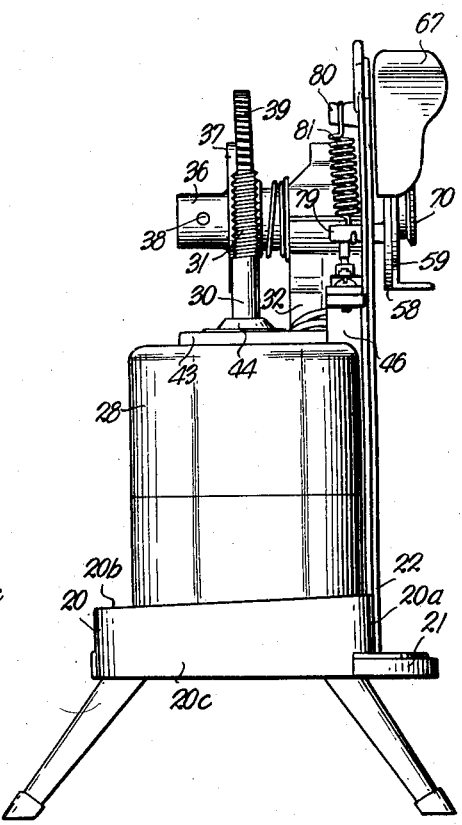
Fig. 2 is a side view from the right in Fig. 1 of the inventive power can opener of Fig. 1, the retractable legs shown in extended position.

Power source or electric motor 28 is mounted on plate 24 with boss 29 extending through opening 25 and the main body of the motor is received in opening 23 of the base top 20b. Primary drive shaft 30 extends vertically from the upper end of the motor behind the front plate and has gear worm 31 formed thereon. Flange 32 (Fig. 12) is rigidly fixed to the rear of plate 22 and carries boss 33, which is also rigidly fixed to the plate 22 at its forward end and has bearing 34 within. Secondary drive shaft 35 extends through boss 33 in bearing 34 and has hub 36 with enlarged flange 37 fixed to the rearmost end thereof by cross-pin 38. Worm gear 39 is mounted on shaft 35 and fixed to flange 37 by rivets 40. Washer 41 encircles a lesser diameter portion 33a of boss 33 and abuts shoulder 33b thereon. Spring 42 is resiliently mounted between washer 41 and the front face of hub 36 and tends to move shaft 35 rearwardly in the boss 33. Worm gear 39 is engaged by gear worm 31 on primary drive shaft 30 whereby shaft 35 is driven in rotation. The necessary direction of rotation of shaft 35 is clockwise in Fig. 1 and counterclockwise in Figs. 4–6.

Upper motor mounting flange 43 has an opening 43a therein through which upper boss 44 of the motor and primary drive shaft 30 extend. Flange 43 is rigidly fixed to or integral with the rear face of plate 22. Shelf 45 of insulating material is mounted on upwardly extending flanges 46 and 47 by screws 48. Primary contact 49 is fixed to the platform 45 by stud 50, while secondary contact 51 is mounted in L-member 52 secured to the platform by stud 53. Electrical leads 54 and 55 are connected to the primary and secondary contact members 49 and 51, respectively. Pivot arm 56, having sleeve 57 of insulating material at the upper end thereof, is also mounted on L-shaped member 52 and is connected to secondary contact 51 in such manner that depression of arm 56 raises the secondary contact 51 to close the circuit with primary contact 49. The construction employed to actuate the contacts 49 and 51 to turn on the power source and rotate shafts 30 and 35 in power operation will now be described.

Our present invention relates primarily to means for (1) turning on the motor 28 in the process of puncturing a can, (2) also providing means by which the motor may be maintained in operation during the entire process of cutting the can after the puncturing is completed and (3) providing means for shutting off the motor after the cutting operation is completed or at any time the operator desires. Manual manipulation of the can opener is required by the operator at all times when the power source is in operation and the power source, conversely, is not in operation at any time the operator is not manually operating the can opener.

We have provided means adaptable to a conventional can opener which will achieve these objects. Therefore, the can engaging and cutting apparatus itself is not, per se, new. We have substantially employed the mechanism disclosed in our Patent No. 2,694,855, entitled "Can Opener," issued November 23, 1954. Certain structure of our inventive apparatus is identical or substantially so with comparable features of that patent, and thus will not be described in unnecessarily complete detail.

Next to front plate 22 but for lever 66 (to be described) is positioned primary plate 58. Secondary outer plate 59 abuts in face to face sliding contact primary plate 58. Rivet 60 engages one side of the two plates through openings therein while stud 61 is fixed to primary plate 58 and extends through a slot 62 in the secondary plate 59. The slot 62 permits limited up and down movement of the rear end of plate 59 about the forward rivet 60 as a hinge. Plate 59 is always urged downwardly, however, by a coil compression spring (Fig. 11) confined between the plates within confronting semi-cylindrical pockets formed by struck-out portions of the plates (63 on plate 59 and 63a, Fig. 10 on plate 58), whereby plate 59 normally occupies a position illustrated in Figs. 4, 5 and 6. This pivotal adjustability is to allow for can seams passing between the feed and cutter wheels, is described in the above patent, and will not be further set forth here.

Plate 59 contains a large aperture 64 in which disc 65 is located. The aperture 64 is shaped to provide stop shoulders 64a and 64b cooperating with a radial lug 65a on disc 65 in order to limit rotation of the latter in two directions. Lever 66 is provided with an upper flange 67 to aid in manipulation thereof. Disc 65 can turn approximately 180° in either direction in aperture 64. Plate 58 has a circular aperture 58a therein to receive a circular plug 68 fixed on the rear of the disc 65 for rotation therein (Fig. 12). The thickness of the plug 68 is equal to or only slightly greater than the thickness of plate 58. The lever 66, which is positioned between the front plate 22 and the plates 58 and 59, has a smaller opening 66a therein through which a sleeve bearing 69, eccentrically mounted in the plug 68 and disc 65, extends, as well as through an opening in the front plate 22.

Can opener drive shaft 35 extends through the sleeve bearing 69 and sleeve bearing 34 (the latter received in boss 33), the plug 68 and disc 65, and has feed wheel 70 threadedly mounted thereon. Rotation of shaft 35 does not rotate the disc 65, plug 68 or bearing sleeve 69. However, the lever 66 is seized to the bearing sleeve 69 which in turn is seized to disc 65 and plug 68 and rotation of the lever 66 around the shaft 35 will, therefore, due to the eccentric mountings of the disc and plug on the sleeve elevate (Fig. 4) or lower (Figs. 5 and 6) the two plates 58 and 59 relative shaft 35.

The spring 42 on boss portion 33a abutting washer 41 and hub 36 serves to exert a force tending to urge the feed wheel 70 toward the exposed face of disc 65. A washer or shim 71, of required thickness, is interposed between wheel 70 and disc 65 to obtain desired lateral spacing between the feed wheel 70 and the overlapping portion of the cutter wheel 75. Shim 72 spaces lever 66 from plate 58 and plug 68. Parts 65, 68, 72 and 66 are also secured together as a unit by rivet 65b and pin 65c.

Above aperture 64, plate 59 has an outwardly dished boss portion 73 carrying a downwardly inclined spindle 74 which has in turn a cutter wheel 75 rotatably journaled thereon. Forwardly and rearwardly of the zone of action of cutter wheel 75 are a pair of fixed shoulder members 76 and 77 adapted to engage the upper rim of a can to stabilize it during the cutting operation, as will be described presently. It can now be seen, as in Patent No. 2,694,855, that plate 58 together with its secondary auxiliary plate 59 forms a swivel carrier for the cutter wheel, by virtue of which the cutter wheel can be shifted through an arc about the axis of shaft 35 as a center, and can be positioned in either limit position; even when the carrier is thus positioned, however, the cutter wheel can move slightly in a direction generally radial to said axis by virtue of the manner in which the auxiliary secondary plate 59 is hinged at 60 to the main plate 58.

The construction and operation of the can opener assembly positioned outward from and including the front plate 59 are substantially the same as that shown in Patent No. 2,694,855. As described, the bearing sleeve 69 is offset from the center of the disc 65 so that the axis of the shaft 35 is eccentrically positioned relative to the axis of the disc. Thus, when the lever 66 is in the position of Figs. 5 and 6, the cutter wheel 75 occupies a position wherein its lower margin overlaps the upper margin of the feed wheel 70. On the other hand, by turning the lever 66 to the position of Fig. 4, the cutter wheel 75 is in a position spaced away from the feed wheel 70. It should be noted that it is the plates 58 and 59 which move relative the front plate 22, not plate 22 relative them. Thus the feed wheel 70 remains in the same vertical position on the front plate 22 while the plates 58 and 59 and the cutter wheel 75 on plate 59 move upwardly or downwardly relative the feed wheel 70.

The apparatus will now be described which causes actuation of the power source in the process of puncturing a can and also assures maintenance of the power source in operation so long as the operator exerts manual force on the lever 66. Referring particularly to Figs. 7, 10 and 11, it will be seen that an opening 78 is formed in and extends through front plate 22 behind the primary plate 58. Opening 78 is roughly of inverted L-shape having vertical portion 78a and horizontal portion 78b extending laterally therefrom. An arm 79 is struck from the primary plate 58 and extends through the vertical portion 78a of the opening 78. Spring anchoring lug 80 is fixed to the back of plate 22 and tension spring 81 is engageable in notches on the upper and lower surfaces of arm 79 and lug 80. The width and depth of the vertical portion 78a of the opening 78 must both be sufficient to permit any motion of arm 79 produced by manipulation of lever 66 and also vertical movement thereof in the actuation of the power switch to be described.

Stop and guide arm 82 is struck from the plate 58 and is positioned within the lateral portion 78b of the opening 78. As previously described, plates 58 and 59 are pivotally mounted around shaft 35. Spring 81 urging arm 79 upwardly tends to maintain stop and guide arm 82 against the top edge of the lateral opening 78b (and thus rotate plates 58 and 59 around shaft 35 in a clockwise direction in Figs. 4-6). The lower edge of opening 78b acts as a limit stop to the depression of stop and guide arm 82. The under edge 66a of arm 66 is so formed as to abut the top edge of struck-out portion 63a (Fig. 10) when the wheels 75 and 70 overlap as in Figs. 5 and 12. As portion 63a is displaced laterally from shaft 35 and plates 58 and 59 and lever 66 are pivoted around shaft 35, sufficient force applied to the top portion 67 of lever 66 above portion 63a will tend to rotate plates 58 and 59 around shaft 35 in a counterclockwise direction in Figs. 4-6 against the tension of spring 81. This action is illustrated in Fig. 6. The mechanism of secondary contact member 51 is adjusted so as to actuate when stop and guide arm 82 reaches the approximate mid-point in the opening 78b as in Fig. 10, in its downward movement and release at approximately the same point in its upward movement. The strength of spring 81 must always be sufficient to return stop and guide arm 82 to its uppermost position and thus break the switch contact at any time the operator fails to manually hold the lever 66 against portion 63a with sufficient force to depress the stop and guide arm 82 past the trip point of the switch.

Figs. 1–3 and 8 show the mounting of the retractable legs within the base 20. An arched leaf spring 83, with its free ends 84 and 85 biased downwardly (as viewed in Fig. 8) is secured to arched flange 86 struck downwardly from plate 24. Paired mounting flanges 87 and 88 are fixed at right angles to the plate 24 at the peripheral edges thereof and opposed to one another. Flanges 87 are positioned inside of flanges 88 for a purpose to be described. Smaller plate 89 and larger plate 90 having paired extended legs 91 and 92, respectively, are mounted on flanges 87 and 88 by studs or rivets 93 and 94 engaging upper legs 95 and 96. Smaller plate 89 has inwardly extending angled engaging flange 97 to abut the resilient strip end 85. The width of the larger plate 90 is sufficiently great that the large plate 90 will fold down over and cover the smaller plate 89 when the legs are retracted as shown in dotted lines in Fig. 8. Plate 90 has inwardly extending angled flange 98 to engage the other end 84 of the resilient strip 83. The inner ends of the angled flanges 97 and 98 are so formed as to be essentially parallel to the ends 85 and 84 of leaf spring 83 when the outer faces of the plates 89 and 90 abut the inner edges of front and rear walls of the base as in Fig. 8. The length of the legs 91 and 92 and the width of the upper leg flanges 95 and 96 must be so gauged as to permit the plates 89 and 90 to be contained within the base cavity when the larger is folded over the smaller. The angled flanges 97 and 98 abut the flexible strip ends as in the dotted line showing of Fig. 8 when the legs are retracted so the resilience of the strip ends maintains them in retracted position. The plates 89 and 90 must be pivoted over the resistance of the strip 83 to the flanges 97 and 98 to the open position shown in Figs. 1–3 and 8.

In operation, whether the plates 89 and 90 are extended or retracted, for the opener to be prepared to receive a can, lever 66 is rotated in a clockwise direction in Figs. 4–6 as in Fig. 4 until the tab 65a abuts the shoulder 64a. A can rim may then be inserted under the edge of the cutter wheel 75 and above the feed wheel 70. Lever 66 is then moved in counterclockwise direction in Figs. 4–6 to lower the cutter wheel 75 upon the end of the can to engage the can. The position of the various parts of the opener when the can is engaged but the end has not been punctured is shown in Fig. 9 with the can indicated in dotted lines at 99. The position of cutter wheel 75 relative feed wheel 70 may be noted relative Figs. 4 and 5 and the position of lever 66 relative Figs. 4 and 5.

As the lever 66 is further rotated in the counterclockwise direction and the cutting edge of the cutter wheel 75 more firmly engages the top of the can to be punctured, a force is exerted on plates 58 and 59 which tends to rotate them around shaft 35. The reason for this is that the point of application of force to lever 66 is displaced laterally from the shaft 35, the pivot point of the lever 66 and plates 58 and 59. Resistance of the end of the can to penetration by the cutter wheel causes this force to tend to move the plates 58 and 59 in a counterclockwise direction in Figs. 4–6 and in a clockwise direction in Fig. 10. A further limitation on the resistance of spring 81 may now be defined. As previously stated, spring 81 must be strong enough to return the can opener assembly to the position of Figs. 1 and 5 when manual force is released on lever 66. At the same time, the resistance of spring 81 is preferably less than the force required to puncture a conventional can top in the power-operated can opener. Accordingly, force applied to lever 66 will move stop and guide arm 82 down past the switch trip point in opening 78b and power source 28 will be actuated. At this point, feed wheel 70 starts to rotate and this applied power aids in puncturing the can, inasmuch as less force is required to effect penetration if the can is being simultaneously fed relative the cutter wheel. Once the can is punctured, if the operator continues to apply force to lever 66, lever 66 then immediately passes down to the position shown in Fig. 10 where the under edge 66a thereof abuts the top of punched-out portion 63a. Continued manual application of force to lever 66 maintains stop and guide arm 82 below the switch-on point and power operation will continue, with feed wheel 70 driving the can rim around and with cutter wheel 75 cutting the top out of the can. As seen in Fig. 10, downward movement of the lever 66 by the operator is limited by engagement of the stop and guide arm 82 with the underlying edge of portion 78b of opening 78. At all times, spring 81 tends to rotate plates 58 and 59 in a clockwise direction in Figs. 4–6, thus tending to shut off the power. Thus the operator must continually apply the predetermined amount of manual force to the top of lever 66 in order to maintain the power source in operation. Any tendency for the can to tilt due to uneven application of force to its top in the cutting thereof is obviated by stabilizing arms or guides 76 and 77 which abut the top of the upper can rim during the cutting process.

Once the can top has been cut from the can, the can may be released by merely moving the lever 66 in a clockwise direction in Figs. 4–6 to move cutter wheel 75 away from the feed wheel 70, thus permitting release of the can from the power-operated can opener.

From the foregoing it will be seen that the invention is one well adapted to attain all of the ends and objects herein above set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all material hereinabove set forth or shown in the accompanying drawings is to be interpreted as illustrative and not in a limiting sense.

Having thus described our invention, we claim:

1. A power-operated can opener comprising a power source, a drive shaft driven by said power source, a plate rotatably journaled on said drive shaft, stationary means rotatably mounting said drive shaft, means limiting the rotation of said plate in both directions around said shaft to a restricted arc between a first and a second extremity, resilient means tending to rotate said plate in one direction around said shaft toward the first extremity of the arc whereby to maintain the plate at the first extremity of said arc when no force is applied to the plate by the operator, said resilient means of sufficient strength to at any time return the plate to the first extremity of its arc when the operator stops application of force to the plate, actuating means for said power source, means cooperating with said plate to contact said actuating means on rotation of the plate a predetermined distance away from the first extremity of its arc toward the second extremity of its arc, a cutter wheel rotatably carried by said plate and at least substantially fixed thereto, a feed wheel fixedly mounted on said drive shaft to rotate therewith, one of said wheels movable toward and away from the other wheel to permit engagement and disengagement of a can rim therebetween, and means for rotating said plate from the first extremity toward the second extremity whereby to actuate said power source when a can is positioned between the cutter and feed wheels.

2. A power-operated can opener as in claim 1 wherein the resilient means tending to rotate said plate toward the first extremity of the arc exerts at least slightly less force than the force required to pierce a can by the cutter wheel whereby the power source will be actuated before a can is pierced by said cutter wheel.

3. A power-operated can opener as in claim 1 wherein the means for limiting the rotation of the plate comprises a slot in the stationary means and an arm fixedly mounted relative to the plate and extending into said slot.

4. A power-operated can opener as in claim 1 wherein the resilient means tending to rotate the plate toward the first extremity is connected to said stationary means and said plate.

5. A power-operated can opener comprising a power source, a drive shaft driven by said power source, a primary plate rotatably journaled on said drive shaft, a stationary plate mounting said drive shaft, a slot in said stationary plate, a first arm fixed to said primary plate extending into said slot, said arm movable with movement of the plate from a first extremity of said slot to the second extremity thereof whereby to limit the rotation of the primary plate in both directions around said shaft to a restricted arc between a first and a second extremity, an opening in said stationary plate in addition to said slot, a second arm connected to said primary plate extending into said opening, actuating means for said power source mounted adjacent said stationary plate adjacent said opening, said secondary arm so positioned on said primary plate as to contact said actuating means when the primary plate is rotated adjacent its second extremity, resilient means connected to the stationary plate and primary plate tending to rotate the latter toward the first extremity of its arc, a cutter wheel rotatably carried by said primary plate and substantially fixedly mounted relative thereto, a feed wheel mounted on said drive shaft to rotate therewith relative said cutter wheel, one of said wheels movable toward and away from the other wheel to permit engagement and disengagement of a can rim therebetween, and means for rotating said primary plate from the first extremity of its arc toward the second extremity thereof.

6. A power-operated can opener as in claim 5 wherein the connection of the resilient means to the primary plate is to the secondary arm fixed thereto.

No references cited.